Aug. 8, 1939.  D. FARR  2,168,980
EDIBLE PRODUCT
Filed Oct. 12, 1932  2 Sheets-Sheet 1

Inventor
Dexter Farr.
By Ogle R. Singleton,
Attorney

Aug. 8, 1939.　　　　　D. FARR　　　　　2,168,980
EDIBLE PRODUCT
Filed Oct. 12, 1932　　　2 Sheets-Sheet 2
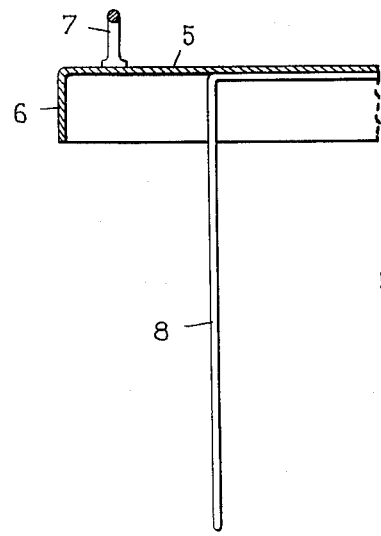
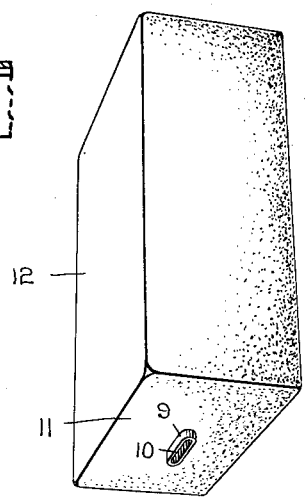
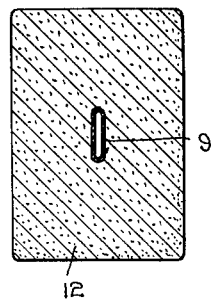
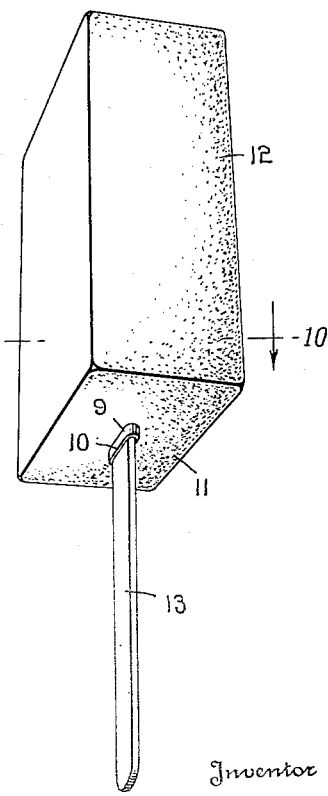
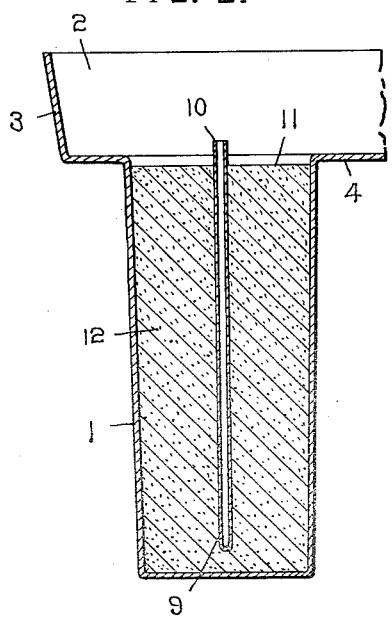
Inventor
Dexter Farr.
By Ogle R. Singleton,
Attorney Patented Aug. 8, 1939

2,168,980

UNITED STATES PATENT OFFICE 2,168,980

EDIBLE PRODUCT

Dexter Farr, Ogden, Utah

Application October 12, 1932, Serial No. 637,503

2 Claims. (Cl. 99—137)

My invention consists in a new and useful improvement in an edible product and the process of and apparatus for producing same, and is particularly designed for the purpose of manufacturing a frozen product provided with an envelope or casing embedded therein for receiving a handle by which the product may be handled during its dispensing and consumption.

My improved product consists of a block of ice cream, or an ice, or other frozen confection, in which is placed a distended waterproof covering in which is received a handle protruding from the block. By my improved process and the use of my improved apparatus, I can produce my improved product so that the handle can be inserted into the ice cream block immediately before it is dispensed, and also may be withdrawn from the block if and whenever desired.

I am aware that it is old to make an edible product, such as a block of ice cream, with a handle inserted therein, but I claim as the novel feature of my invention the provision of a distended envelope frozen in the product and a handle which can be inserted into and withdrawn from the envelope as desired.

It is obvious that it is a very great advantage to provide such blocks of ice cream with means for inserting the handles therein, rather than to freeze the handles irremovably therein. With my form of product, the blocks can be more effectively and economically packed for shipment or storage, without the handles, and moreover by providing the handles with temporary sanitary covers all danger of contamination of the handles or product is eliminated, as the sanitary handle is inserted into the product immediately before its dispensing and consumption.

Another important advantage of my invention is the possibility of the withdrawal of the handle from the product. This is necessary in a sales-promotion plan by which certain handles bear suitable indicia to indicate that the purchasers thereof are entitled to a prize. By this plan, the dealer having inserted the handle, dispenses the product, and the purchaser, before consuming the product, may remove the handle to examine it to ascertain whether the handle bears the indicia to entitle the purchaser to a prize, and can then return the handle to the ice cream block, for use while consuming the block.

While I have illustrated in the drawings filed herewith and have hereinafter fully described one specific embodiment of my invention of my improved product, and apparatus for producing same, it is to be distinctly understood that I do not consider my invention limited to said specific embodiments, but refer for its scope to the claims appended hereto.

In the drawings:

Fig. 5 is a view similar to Fig. 1, showing the cover after it has been removed from the mould, the distender form having been withdrawn from the envelope.

Fig. 6 is a vertical section of the mould showing the open envelope embedded in the frozen edible product.

Fig. 7 is a persective view of the frozen edible product after its removal from the mould.

Fig. 8 is a perspective view of the handle in its sanitary temporary envelope.

Fig. 9 is a perspective view of the edible product, the handle being inserted in the envelope, ready for dispensing.

Fig. 10 is a horizontal section on the line 10—10 of Fig. 9.

Figure 1:
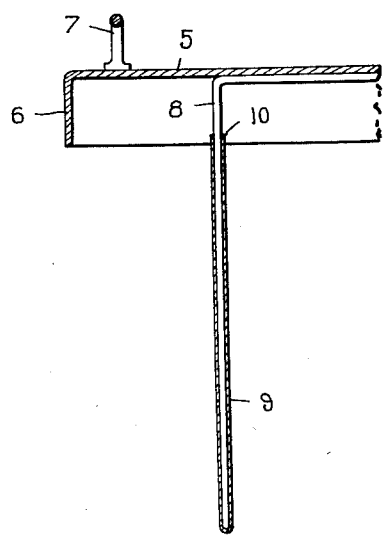
Fig. 1 is a vertical section of the cover of my apparatus with one of the envelopes on its distender form.

In the drawings, the mould 1, of any suitable form, has the upper pan or tray 2 with the sides 3 and bottom 4. The cover 5 has a suitable flange 6 to rest upon the bottom, and a handle 7 for manipulation of the cover 5. Suitably disposed on the cover 5 is the distender form 8 upon which is carried the moisture-proof envelope 9. It is obvious from the drawings that the form 8 is so placed that the envelope 9 is disposed centrally of the mould 1 when the cover 5 is applied to the tray 2. It is to be noted that the parts are so proportioned that when the cover 5 has been placed in the tray 2 the upper open end 10 of the envelope 9 will be above the top 11 of the mass of the edible product 12 in the mould 1.

It is obvious that my apparatus may comprise a plurality of moulds 1, each with its corresponding distender form 8, in any suitable arrangement. I have illustrated only one unit in the drawings for the purpose of disclosing my invention.

The handle 13 is provided with the sanitary temporary envelope 14 of any suitable material.

Figure 3:
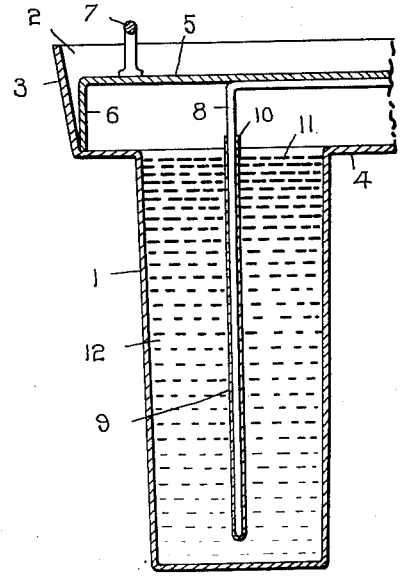
Fig. 3 is a vertical section of my apparatus showing the parts illustrated in Figs. 1 and 2 in combination, the cover being applied to the mould, the distender form disposing the envelope in its proper position in the unfrozen edible product.
Figure 2:
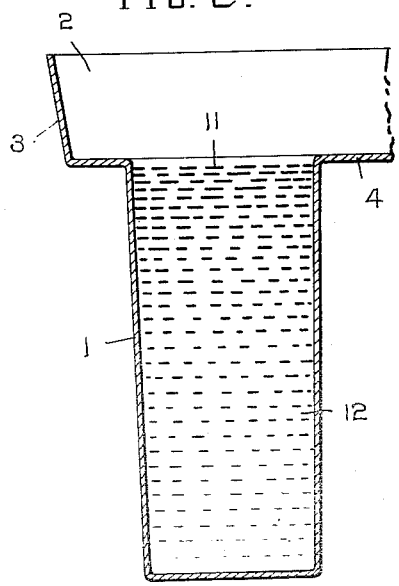
Fig. 2 is a vertical section of one of the moulds of my apparatus showing the mold filled with the unfrozen edible product.
Figure 4:
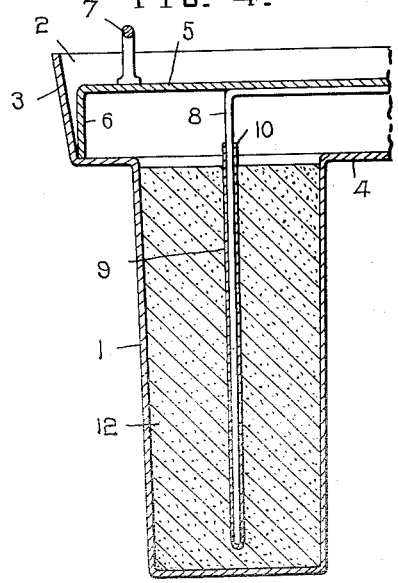
Fig. 4 is a view similar to Fig. 3, but showing the edible product after its refrigeration, congealing the product about the envelope.

My improved process of producing my improved edible product, and the use of my improved apparatus is as follows. The envelopes 9 are slipped on the distender forms 8 (see Fig. 1). The properly prepared material for the edible product is put into the moulds 1 (see Fig. 2), the cover 5 is then applied to the tray 2, thus positioning each of the envelopes 9 in the unfrozen mass of the product in each mould 1, respectively, and closing the moulds 1 (see Fig. 3). The whole apparatus is then subjected to the requisite refrigeration to congeal the material in the moulds 1, as desired (see Fig. 4). The cover 5 is then removed, thus drawing the distender forms 8 from the distended envelopes 9 embedded in the frozen material 12, and leaving each envelope 9 in open form (see Figs. 5 and 6). The frozen material is then extricated from the moulds 1, in any suitable way, the product being as indicated in Fig. 7, the open end 10 of the envelope 9 protruding from the end 11 of the frozen edible product 12. I provide each handle 13 with a suitable sanitary envelope 14 (see Fig. 8), and, when this envelope 14 has been removed, the handle 13 is inserted into the envelope 9 and passes into the body of the edible product 12, to serve as its support as shown in Fig. 9.

It is to be particularly noted that since the envelope 9 is of such a character as to be impervious to moisture, and since the handle 13 is dry when the handle 13 is inserted into the envelope 9, as illustrated in Fig. 9, the handle 13 will not adhere to the envelope 9, and can therefore be withdrawn as and whenever desired.

Having described my invention, what I claim is:

1. A food product of the character described comprising a hollow shell embedded in a body composed of a congealed edible substance; said shell being closed at the inner end thereof and being open at the outer end thereof exteriorly of said body, and forming a socket of substantial depth within said body for receiving a separate handle member.

2. A food product of the character described comprising a hollow shell embedded for substantially the entire length thereof in a body composed of a frozen edible substance; said shell forming a socket within said body and having an opening thereinto contiguous to one end of said body, and a member received at one end within said socket and projecting at the other end beyond the socket to form a handle.

DEXTER FARR.